United States Patent [19]

Mikan

[11] Patent Number: 4,949,080
[45] Date of Patent: Aug. 14, 1990

[54] COMPUTER KEYBOARD CONTROL ACCESSORY

[76] Inventor: Peter J. Mikan, 31 Greenfield Rd., Milford, Conn. 06460

[21] Appl. No.: 283,548

[22] Filed: Dec. 12, 1988

[51] Int. Cl.⁵ .............................................. G09G 5/00
[52] U.S. Cl. .................................. 340/711; 340/706; 340/709; 248/918
[58] Field of Search ............... 340/710, 709, 711, 700, 340/706; 273/148 B; 248/1 B, 918; 341/22, 23, 24; 200/5 A, 6 A

[56] References Cited

U.S. PATENT DOCUMENTS

| | | | |
|---|---|---|---|
| 4,246,452 | 1/1981 | Chandler | 200/5 A |
| 4,456,315 | 6/1984 | Markley et al. | 248/1 B |
| 4,469,330 | 9/1984 | Asher | 273/148 B |
| 4,488,146 | 12/1984 | Burchart | 340/711 |
| 4,528,428 | 7/1985 | Gotoh et al. | 200/5 A |
| 4,692,740 | 9/1987 | Washizuka et al. | 341/22 |
| 4,733,229 | 3/1988 | Whitehead | 340/709 |
| 4,735,520 | 4/1988 | Suzuki et al. | 341/22 |
| 4,794,381 | 12/1988 | Iwai | 340/700 |
| 4,851,618 | 7/1989 | Amino et al. | 200/5 A |

FOREIGN PATENT DOCUMENTS 0117639 9/1984 European Pat. Off. ............ 248/918

OTHER PUBLICATIONS

IBM Technical Disclosure Bulletin, vol. 28, No. 2, Jul. 1985.

Primary Examiner—Jeffery A. Brier

[57] ABSTRACT

A computer keyboard control accessory in the form of an enclosure having a bottom entrance opening through which a computer keyboard can be introduced, a top access opening through which the keys of the keyboard extend so as to be operable by the user in the conventional manner, and a joystick fixedly mounted in the top panel of the enclosure and having a position convenient to the right hand of the user. The enclosure has a configuration similar to that of the keyboard, and the arrangement is such that the latter can be clamped between the undersurface of the enclosure's top panel and the enclosure's removable bottom plate. By virtue of the fact that the keyboard and joystick are housed in the one enclosure, and by the provision of a table space on the enclosure's top panel just in front of the joystick to accommodate the right hand of the user, greatly simplified operation is realizeable, as is improved control of the joystick, since the latter is securely held in a fixed position with respect to the keyboard and its keys. Insertion into and removal of the keyboard from the enclosure can be undertaken in only several minutes, and requires no special tools or skilled personnel. Further, no modification of the keyboard per se is required in order to use the accessory.

18 Claims, 2 Drawing Sheets

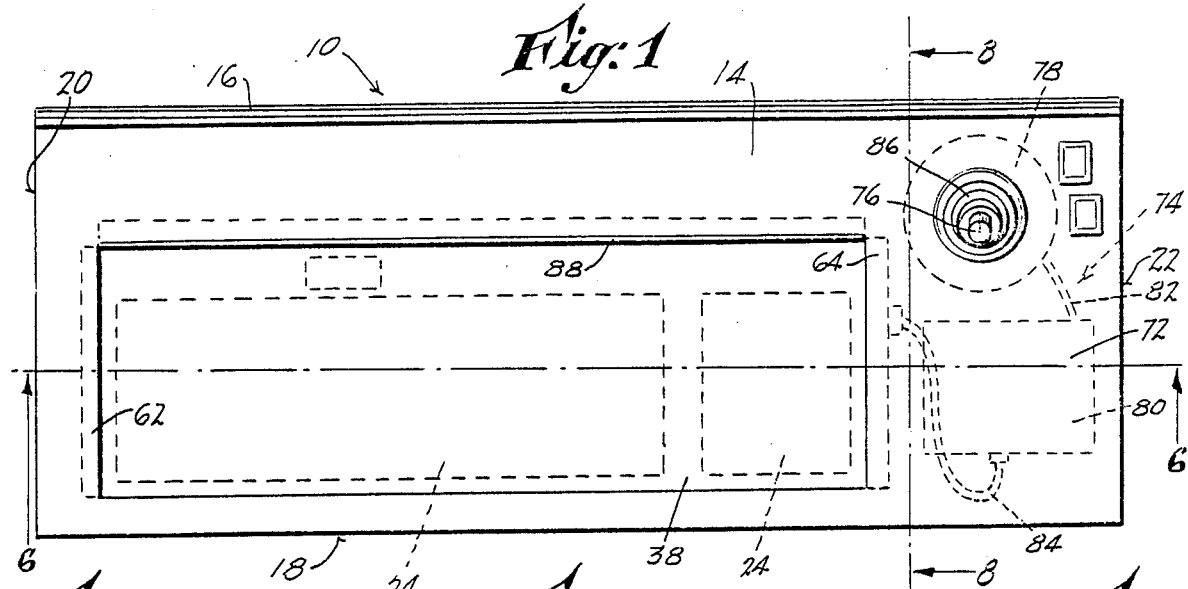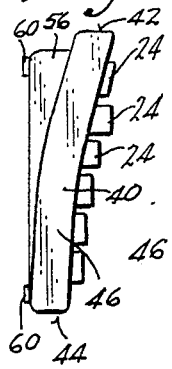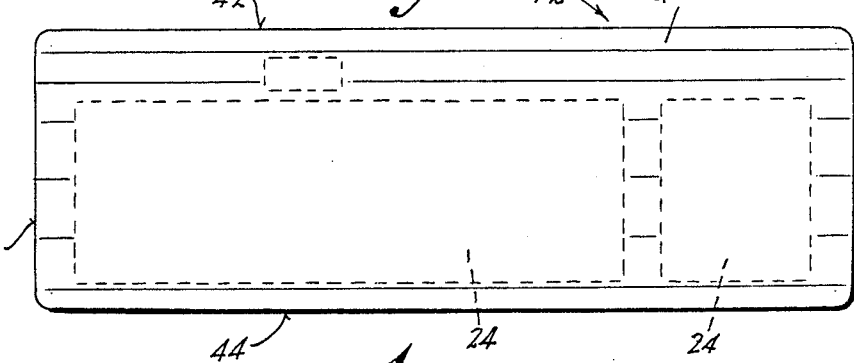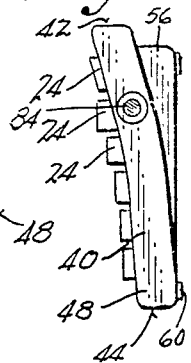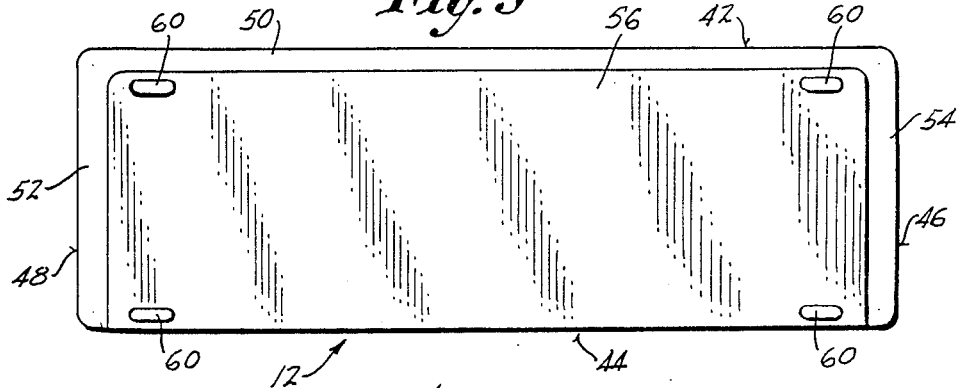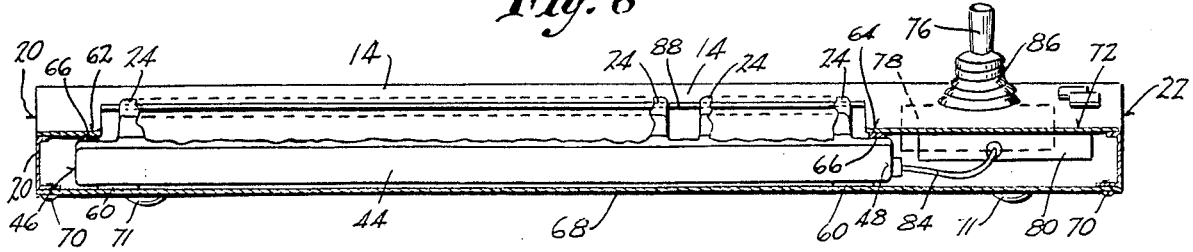

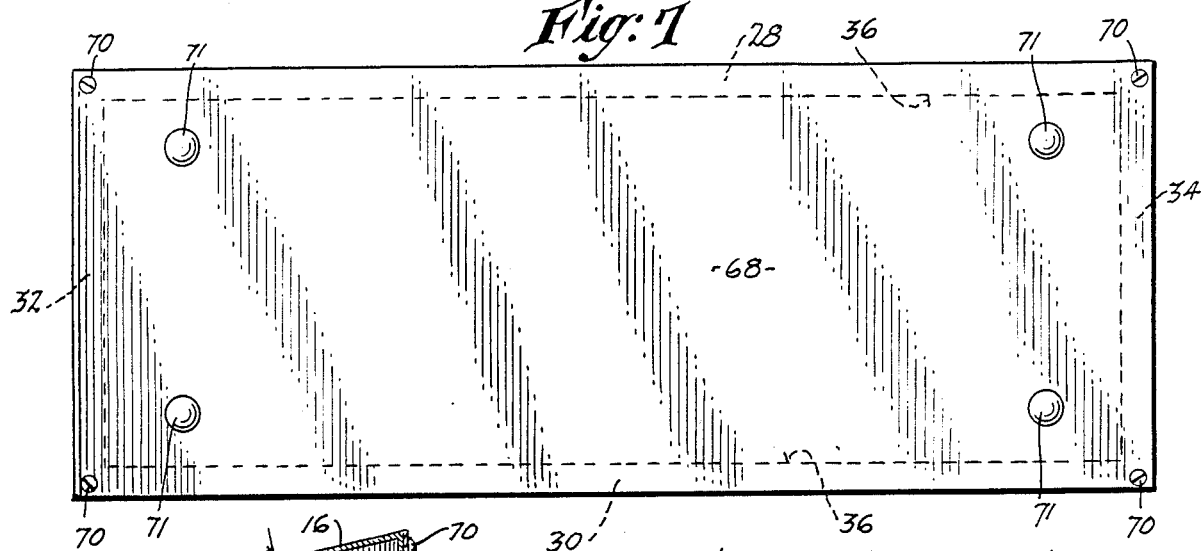
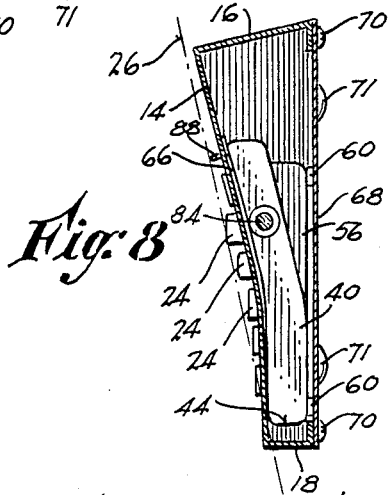
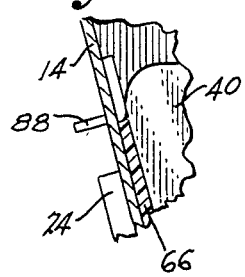
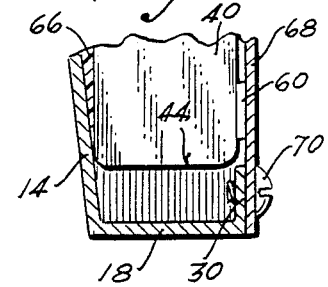

COMPUTER KEYBOARD CONTROL ACCESSORY

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to computer peripheral equipment, and more particularly to controllers employed therewith, one such device being commonly termed a "mouse"; another such device being known as a "joystick"; and still another known as a "track ball". In general, a "mouse" or a "joystick" is employed to position or control movement of a cursor over the screen or CRT of a computer.

2. Description of the Related Art Including Information Disclosed Under 37 CFR §1.97–1.99

In many existing personal computer stations, the keyboard is electrically connected to the remainder of the station by means of a flexible cable. The same type of connection is true of "mouse" devices employed with such computers, or alternately with various types of "joystick" or "track ball" devices associated therewith.

One of the problems encountered with a "mouse" is that it requires a considerable amount of table space for operation, since it must be manipulated in such a manner that a ball or roller carried on its underside rotates by virtue of its engagement with the supporting table surface when the mouse is shifted horizontally thereon.

Prior joystick devices have usually taken the form of a module that is separate from the computer console and from the computer keyboard i.e. the joystick was contained in its individual casing or box having a lead extending to the computer. Rubber feet frictionally held the box against slippage over the surface of the table. Such arrangement had the distinct disadvantage that only poor control could be exercised over the movement of the joystick, since it was necessary to manipulate the joystick lever while holding the casing or box against inadvertent shifting.

One proposed solution was to incorporate a joystick into the existing keyboard console or casing; such an approach however was impractical since more often than not, there was insufficient room in the existing keyboard case, and therefore any "retro-fit" type of installation would involve modification of the keyboard, frequently to the extent that circumstances could arise involving possible voiding of the computer manufacturer's warranty. Also, in such an installation, there would undoubtedly be required drilling, or other types of mechanical alteration of the keyboard casing. To my knowledge, all such proposals were ultimately deemed to be impractical or unworkable from the commercial standpoint.

SUMMARY OF THE INVENTION

The problem noted above in connection with discrete keyboards and control means such as joystick modules is obviated by the present invention which has for one object the provision of a novel and improved keyboard control accessory which can be accomodated to the existing keyboard console is extremely simple in its structure, and which greatly simplifies and facilitates the proper operation of a joystick or other control means associated with the keyboard and controller of a computer console.

A related object of the invention is to provide an improved keyboard control accessory of the kind indicated, which does not require any modification whatsoever of the existing keyboard console, thereby avoiding all problems associated with drilling or reworking of a keyboard casing, which possibly could void the manufacturer's warranties, etc.

Still another object of the invention is to provide an improved control accessory as above characterized, wherein there is greatly facilitated the single-hand use of the control means or joystick, since by the invention such joystick is made an integral part of the keyboard console or module, and there is provided a working space on the module on which the user can rest his hand while manipulating the joystick.

A still further object of the invention is to provide an improved control accessory in accordance with the foregoing, wherein assembly into, and separation of the keyboard from the accessory can be accomplished within only several minutes, and without the use of special tools or skilled personnel.

Yet another object of the invention is to provide an improved control accessory as above set forth, wherein ease of operation of the keyboard is not sacrificed in the least, as compared with use of such a keyboard by itself. The keyboard retains its exact and original characteristics as regards key pressure, key spacing, key size, and relative positioning of the keys, etc.

The above objects are accomplished by a novel and improved control accessory comprising means providing an enclosure for a computer keyboard of the type having keys disposed generally in a predetermined plane of action and having a manually engageable and operable control member, said enclosure-providing means including an electrical control adapted for connection to the computer keyboard and having a manually engageable and operable control member, wherein the enclosure-providing means has a unique keyboard mounting and an entrance opening in which the computer keyboard can be inserted. The enclosure-providing means has an access opening through which the keys of the computer keyboard are accessible. Abutment surfaces of the enclosure-providing means engage upper surfaces of an inserted computer keyboard to position and retain the latter therein. There is also provided on the enclosure-providing means a generally flat top table surface adjoining the access opening thereof, on which a user can conveniently rest his hand while manipulating the operable control member. The top table surface is so disposed as to be generally coplanar with the keys of the computer keyboard. The enclosure-providing means can firmly clamp an inserted computer keyboard in position against its abutment surfaces.

The keyboard and its keys are thus securely retained in a fixed position with respect to the manually operable control member or joystick, whereby manipulation of the latter is greatly facilitated, and the convenience during use is significantly enhanced.

Other features and advantages will hereinafter appear.

BRIEF DESCRIPTION OF THE DRAWINGS

FIG. 1 is a top plan view of the keyboard control accessory of the present invention, illustrating a manually operable control member or joystick mounted on an enclosure which has in its upper or top wall, an access opening through which the keys of a keyboard can extend so as to be accessible to the user.

FIG. 2 is a top plan view of a keyboard, which is preferably of conventional type, intended for use with the enclosure portion of the accessory of FIG. 1. The keys are diagrammatically illustrated by the broken lines.

FIG. 3 is a left end elevation of the keyboard of FIG. 2.

FIG. 4 is a right end elevation of the keyboard of FIGS. 2 and 3.

FIG. 5 is a bottom plan view of the keyboard of FIGS. 2-4.

FIG. 6 is a section taken on the line 6—6 of FIG. 1, illustrating the joystick, and illustrating diagrammatically, electrical connections between it, an electrical interface associated with it, and the keyboard.

FIG. 7 is a plan view of the accessory of FIGS. 1 and 6.

FIG. 8 is a section taken on the line 8—8 of FIG. 1.

FIG. 9 is a fragmentary section, enlarged, of a portion of the accessory shown in FIG. 8, and more particularly illustrating a resilient compression strip employed as a cushion between the keyboard and the underside of the enclosure portion of the accessory.

FIG. 10 is a fragmentary section, enlarged, of another portion of the accessory shown in FIG. 8, particularly illustrating the nature of a bottom plate of the enclosure as it is employed to engage and clamp against the existing rubber feet of the keyboard, so as to retain the latter in a fixed position in the enclosure.

FIG. 11 is a front elevation of one compression strip of the type shown in FIG. 9, said strip functioning as a cushion between the underside of the top wall of the enclosure and the upper surface of the keyboard, and FIG. 12 is an edge view of the compression strip of FIG. 11.

DESCRIPTION OF THE PREFERRED EMBODIMENT

Referring to FIG. 1 the improved keyboard accessory as provided by the invention comprises an enclosure means or box-like structure generally designated by the numeral 10 in which there can be mounted a computer keyboard assemblage or console 12 of the type illustrated in FIGS. 2-5. The enclosure 10 has a concave-upward top wall or panel 14, a back wall 16, a front wall 18, and left and right side walls 20, 22 respectively. The keys of the keyboard 12 are indicated at 24, and are seen to lie generally in a plane of action 26, FIG. 8.

The enclosure means further has four bottom peripheral flanges indicated 28, 30, 32 and 34 respectively, FIG. 7, defining a generally rectangular entrance opening through which the keyboard console can be inserted during its initial installation in the enclosure means.

In the top wall or panel 14 there is an access opening 38 through which the keys 24 of the keyboard can project, as shown in FIG. 8. The keyboard console 12 itself is of conventional construction, such as that which accompanies an Apple (a registered trademark) computer, the keyboard housing of the keyboard console having a rectangular body portion 40, a rear edge portion or rear wall 42, a front, edge portion or front wall 44, and left and right side edge portions or walls 46 and 48 respectively.

At the underside of the keyboard 12 are shoulders or ledges 50, 52 and 54 as shown in FIG. 5. A depending body portion 56 of the keyboard is illustrated in FIGS. 3-5. The bottom wall of the keyboard console is usually provided with four rubber feet 60.

By the present invention the access opening 38 is partially defined by a left abutment portion 62 and a right abutment portion 64. Disposed between each abutment portion 62 and 64 of the enclosure means 10, and the corresponding side edge portion 46, 48 respectively of the keyboard console 12, is a compression strip 66 which is constituted of resilient, yieldable rubber or plastic material, and which becomes compressed under the pressure of the abutment portions 62, 64 pressing on the side edge portions of the keyboard 12. FIG. 9 shows one of the compression strips 66, sandwiched between the panel 14 and the keyboard 40. The strip per se is illustrated in FIGS. 11 and 12.

In accomplishing a firm, vibration-resistant retention of the keyboard console 12 in the enclosure 10, there is provided a unique positive clamping arrangement involving the bottom plate 68 of the enclosure, which when assembled to the flanges 28-34 by means of sheet metal screws 70, presses against all four rubber feet 60 on the bottom panel of the keyboard console, as in FIGS. 8 and 10. The plate 68 in turn has four rubber mounting feet 71 as shown in FIG. 7.

Further, according to the present invention the panel 14 provides a table-top surface 72 of significant expanse, on which the user can rest his right hand, while he is manipulating a control member of the accessory, as for example a joystick 76. Associated with the latter are electronic components or circuitry; beneath the table-top surface 72 of the panel 14 is a control means generally designated 74, which in the present instance comprises an electronic interface module 80 whose function it is to convert X-axis and Y-axis movement of the control member or joystick 76 into electrical signals capable of controlling a pointer or cursor on the screen (not shown) of the computer. As an alternative, the control member can take the form of a "track ball". Cables 82 and 84 connect the interface circuit 80 to the joystick 76 and to the computer keyboard console respectively. A rubber boot 86 of conventional construction is preferably included with the joystick.

Since the particulars of the electronics of the joystick and its interface circuitry form no part of the present invention, further discussion thereof is not undertaken. The joystick can be of conventional construction, as can be the interface circuitry, these components being well known in the personal computer field. The same is true if a "track ball" were to be substituted for the joystick.

The joystick may be of a type manufactured by ICS, of Ede, Netherlands, having the part No. JST/M.

Further by the invention there is provided, at the elongate rear edge of the access opening, reinforcement means comprising an upturned stiffening flange 88, FIGS. 8 and 9, extending for substantially the entire length of the access opening 38. The flange provides both a decorative effect, as well as strengthening the panel 14 along the opening 38, to minimize any tendency for warping or bending of the panel in a longitudinal direction. It also catches dust or other debris, and prevents it from dropping through the access opening into the area around the keys of the keyboard 12.

The disclosed accessory of the invention has the following advantages over prior keyboard/joystick devices. First, the accessory can be employed with a computer keyboard console housing of conventional design, preferably an Apple Macintosh (a registered trademark) computer, without any modification of the keyboard housing. Thus there is no need for re-design of the keyboard housing; nor is removal of the covers of the keyboard housing required, in order to use it with the accessory of the present invention. Also, there is had the convenience of a combined or integrated keyboard and joystick which are held fixed in position with respect to one another, as opposed to previous designs where a separate joystick module was employed, which was susceptible of shifting or moving around on the working surface of the table while the device was being manipulated. By the provision of the table top surface 72 of the enclosure 10, the user can conveniently rest his right hand on this area, in a steady manner, and precisely and accurately control the joystick without encountering interference from slippage or inadvertent movement of the stick. Finally there is a distinct advantage in having both the keyboard and joystick in a single enclosure which has a common working plane 26, which provides a neat appearance, and which also eliminates the need for any additional external cables extending between the joystick and the keyboard console, or between the joystick and the computer main console.

Also circumvented are problems which might occur with possible voiding of a manufacturer's warranty in the event that the user attempted to otherwise fasten a joystick to a keyboard in another manner, as by drilling, screwing into, or otherwise altering the keyboard console.

The disclosed device is thus seen to represent a distinct advance and improvement in the field of computer peripheral equipment.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

LIST OF REFERENCE SYMBOLS

10 Enclosure means generally
12 Keyboard, computer
14 Top wall or panel
16 Back wall
18 Front wall
20 Left wall
22 Right side wall
24 Keys
26 Plane of action
28 Bottom flange
30 Bottom flange
32 Bottom flange
34 Bottom flange
36 Entrance opening
38 Access opening
40 Rectangular body portion
42 Rear edge
44 Front edge
46 Side edge (left)
48 Side edge (right)
50 Shoulder or ledge
52 Shoulder or ledge
54 Shoulder or ledge
56 Depending body portion of keyboard
60 Rubber feet
62 Left abutment portion
64 Right abutment portion
66 Compression strips
68 Bottom plate
70 Screws
71 Rubber feet
72 Table top surface
74 Control means (generally)
76 Joystick
78 Circuitry of joystick control
80 Interface circuitry
82 Cable
84 Cable
86 Rubber boot
88 Stiffening flange

What is claimed is:

1. A keyboard construction for computers and the like, comprising in combination:
   (a) a keyboard console consisting of an enclosing housing which forms an enclosed space and which has spaced-apart walls consisting of a bottom wall, a front wall, a rear wall, left and right side walls, and a top wall with a through opening which is spanned by an array of keys,
   (b) an electrical control means adapted for electrical connection to said keyboard console, said control means having a manually engageable and operable control member,
   (c) an enclosure for the keyboard console housing, said enclosure having an entrance opening in which the keyboard console can be inserted, and having an upper wall containing an access opening through which the keys of the keyboard console can be accessed, said enclosure having abutment surfaces at said access opening, said abutment surfaces being adapted to engage and to butt against said keyboard console to thereby position the console in the enclosure, said upper wall of the enclosure surrounding said access opening and providing a rest on which a user can place his hand, said upper wall of the enclosure being disposed so as to be generally coplanar with the keys of the keyboard console and said control member of the control means being mounted in said upper wall of the enclosure to enable the control member to be conveniently actuated by said hand resting on said upper wall, and
   (d) clamping means carried by said enclosure, said clamping means being engageable with the keyboard console, thereby to clamp the keyboard console in position in the said enclosure against the said abutment surfaces of the enclosure.

2. A keyboard construction as set forth in claim 1, wherein:
   (a) said electrical control means comprises joystick-operated circuitry.
   (b) said control member comprising a joystick.

3. A keyboard construction as set forth in claim 1, wherein:
   (a) said clamping means covers at least a portion of the said entrance opening of the enclosure.

4. A keyboard construction as set forth in claim 1, wherein:
   (a) said clamping means covers the entire entrance opening of the enclosure and constitutes a bottom wall thereof.

5. A keyboard construction as set forth in claim 1, wherein:
   (a) the said enclosure has a bottom portion, and has the said entrance opening in its bottom portion,
   (b) said enclosure having front, back, and side walls connected to said upper wall and to each other to form a box which is open at the bottom portion.

6. A keyboard construction as set forth in claim 5, wherein:
   (a) the upper wall of the enclosure is concave upward.

7. A keyboard construction as set forth in claim 5, wherein:
   (a) the access opening of the upper wall has an elongate edge adjacent the back wall, said edge being provided with reinforcement means.

8. A keyboard construction as set forth in claim 7, wherein:
   (a) the reinforcement means on the edge of the access opening comprises an upturned flange.

9. A keyboard construction as set forth in claim 1, wherein:
   (a) said keyboard console is constituted as a unitary assemblage, and as a unit is capable of installation in and removal from the said enclosure.

10. A keyboard construction for computers and the like, comprising in combination:
    (a) a keyboard console consisting of an enclosing housing which forms an enclosed space and which has spaced-apart walls consisting of a bottom wall, a front wall, a rear wall, left and right side walls, and a top wall with a through opening which is spanned by an array of keys,
    (b) an enclosure for the keyboard console, said enclosure comprising a box-like structure having a top panel with an access opening through which the keys of the keyboard console can be accessed,
    (c) said top panel having oppositely-disposed edges constituting abutment means for overlying and engaging peripheral portions of the top wall of the keyboard console,
    (d) said box-like structure having a bottom portion and an entrance opening at its bottom portion, said entrance opening being of a size sufficient to permit insertion of the keyboard console therethrough, and
    (e) a removable bottom plate for covering said entrance opening, said bottom plate having an abutment surface for engagement with the bottom wall of the keyboard console to clamp the latter against the abutment means of the top panel of the enclosure.

11. The invention as set forth in claim 10, and further including:
    (a) joystick means mounted in said top panel,
    (b) said joystick means being fixed with respect to said keyboard console and keys.

12. The invention as set forth in claim 10, and further including:
    (a) compression strips constituted of yieldable substance, interposed between the abutment means of the top panel and the keyboard console to provide a cushioning effect therebetween.

13. The invention as set forth in claim 10, wherein:
    (a) said keyboard console has rubber feet,
    (b) the abutment surface of said bottom place engaging the rubber feet of said keyboard console.

14. The invention as set forth in claim 10, and further including:
    (a) control means mounted in said box-like structure,
    (b) said control means being fixed with respect to said keyboard console and keys.

15. A keyboard construction as set forth in claim 10, wherein:
    (a) said keyboard console is constituted as a unitary assemblage, and as a unit is capable of installation in and removal from the said enclosure.

16. A keyboard construction for computers and the like, comprising in combination:
    (a) a keyboard console consisting of an enclosing housing which forms an enclosed space and which has spaced-apart walls consisting of a bottom wall, a front wall, a rear wall, left and right side walls, and a top wall with a through opening which is spanned by an array of keys,
    (b) a control member, and
    (c) an enclosure for mechanically securing together said control member and keyboard console, said enclosure comprising a box-like structure having means for fixedly mounting the control member,
    (d) said box-like structure further having a top panel with an access opening through which the keys of the keyboard console can be accessed,
    (e) said box-like structure having an entrance opening sufficiently large to admit the said keyboard console, and
    (f) means on said box-like structure providing a releasable support for said keyboard console to hole the same substantially in a fixed position in the enclosure and with respect to the control member, whereby the said keyboard console can be readily installed in or removed from the box-like structure through the said entrance opening, as desired.

17. The invention as set forth in claim 16, wherein:
    (a) said control member comprises a joystick.

18. A keyboard construction as set forth in claim 16, wherein:
    (a) said keyboard console is constituted as a unitary assemblage, and as a unit is capable of installation in and removal from the said enclosure.

* * * * *